Figure 6:
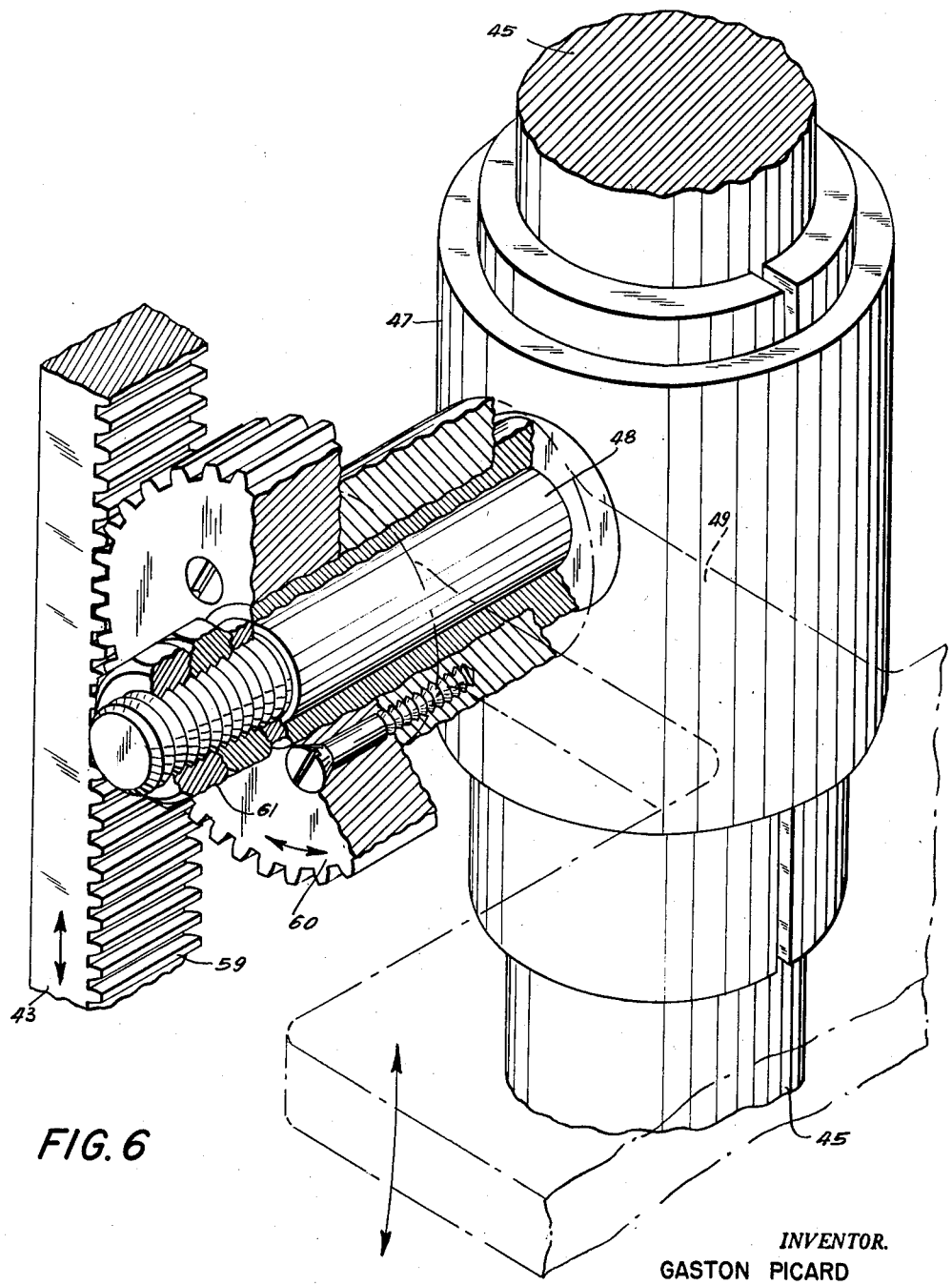

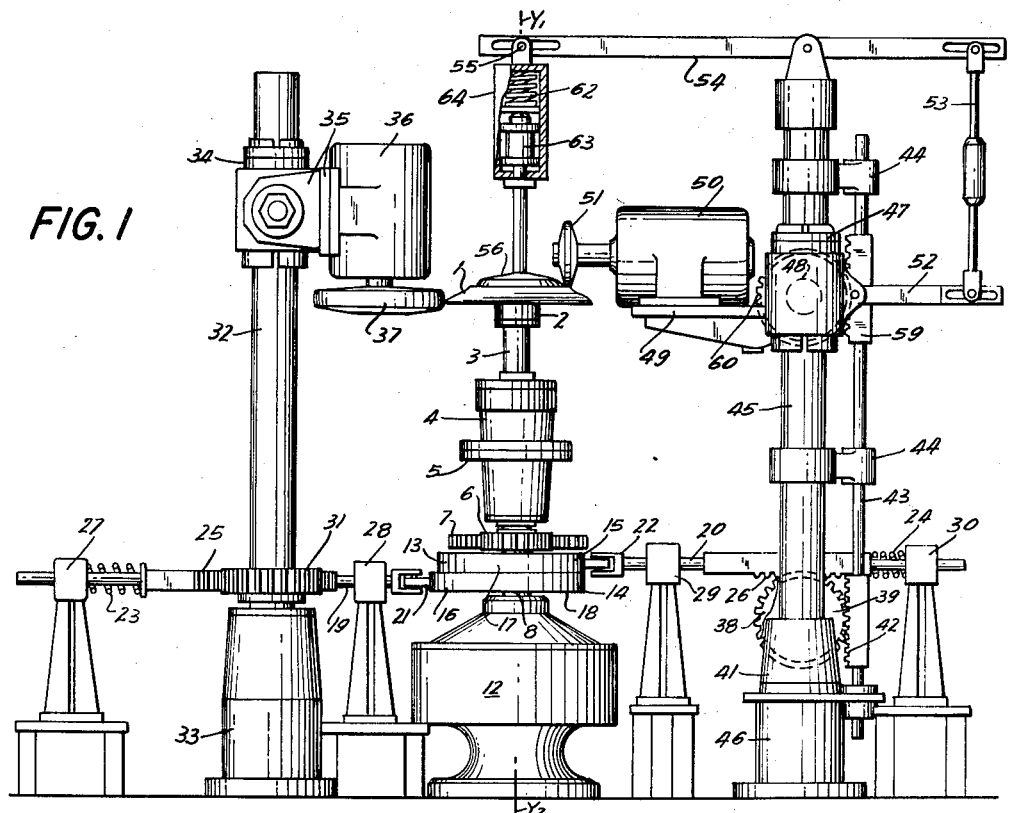

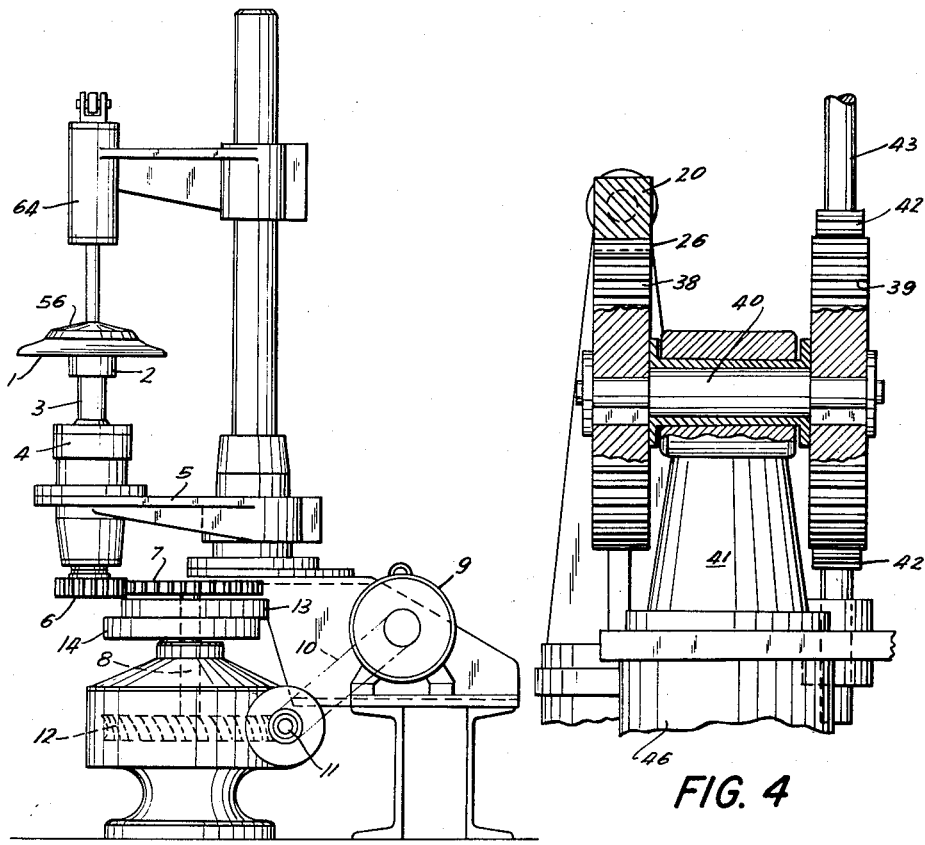
FIG. 3
FIG. 4
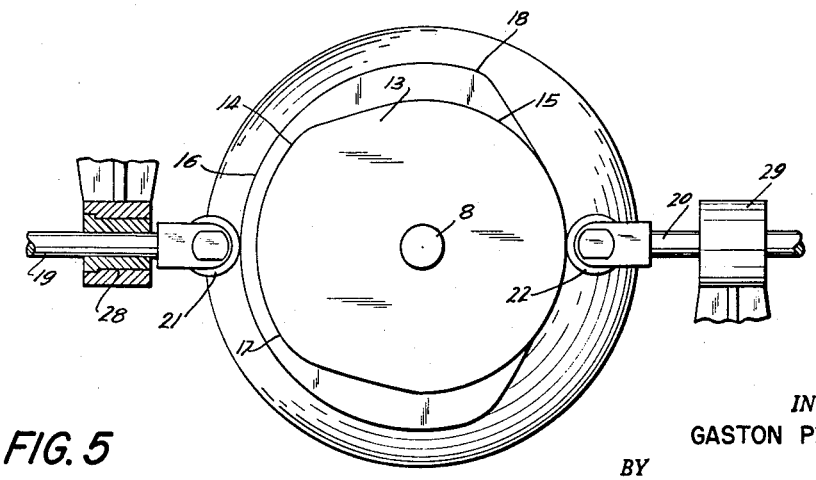
FIG. 5
INVENTOR.
GASTON PICARD
BY
Bauer and Seymour
ATTORNEYS … # 2,928,368
Patented Mar. 15, 1960

2,928,368

APPARATUS FOR THE DECORATION OF ARTICLES

Gaston Picard, La Chapelle-Saint-Mesmin, France, assignor to Societe Anonyme des Glaces et Produits Chimiques de Saint-Gobain, Chauny et Cirey, Paris, France Application November 16, 1956, Serial No. 622,674

Claims priority, application France November 18, 1955

18 Claims. (Cl. 118—102)

The present invention relates to the decoration of articles, for example, glass plates or dishes.

It is well known to use in the decoration of articles with enamel or paint a screen enabling to obtain a predetermined pattern or design. But with this method of decoration it is not possible to obtain constantly a sharp separation line between the decorated and non-decorated surfaces of the articles. This is due to the difficulty encountered in the application of a rigid screen on articles which have not always regular surfaces and are not identical from one to another.

This invention has for its object to provide a method by which such difficulties are avoided. The method according to the invention consists in that the decorative material, enamel for example, is applied on the whole surface, and thereafter removed with a rotating rubber or buffing tool in predetermined regions in order to obtain the desired design. Subsequently the enamel is baked or the article submitted to all treatment necessary to achieve the decoration.

The rotating rubbing member can be made, for example, of brushes, in particular metallic brushes, with wires or threads of other material radially mounted around the axle of rotation. It may also be constituted by discs of a supple material, as felt.

The rubbing member is rotated at high speeds, for example 1200 rotations per minute. The active peripherical surface of the rubbing member may be cylindrical or of any convenient shape or contour adapted to the form of the article. The peripheral contour can be cut on the rubber by rotating it in contact with a tool of a corresponding form.

With enamels having a resinous base it is possible by the method according to the invention to obtain patterns or designs with sharply delimited regions in utilizing a metal brush whose flexibility ascertains a good contact between the brush and the surface.

With enamels having as base a mixture of water and alcohol good results are obtained with a felt disc.

The article covered with the decorative material can be placed on a rotating support and the rubbing member can be brought into contact with the article. It is also possible to place the article on a fixed support and to move the rubber around the article according to the pattern or design which is to be produced.

The method according to the invention enables to decorate articles of revolution as plates for example and also articles which are not of revolution as dishes oval or rectangular, etc.

The present invention has also for its object to provide an apparatus for carrying out the method according to the invention. This apparatus includes essentially a rotating support for the articles, rotating rubbing tools and means enabling the rubbing tools to be alternatively brought into contact with and separated from the articles.

The following description is given as an example and relates to an apparatus for the decoration of plates on which two concentric rings are produced by removing the covering enamel on the one hand, along the edge of the plate and on the other hand round the bottom at the junction of the bottom with the border.

For a better understanding of the invention reference is made to the accompanying drawings in which:
Fig. 1 is an elevation view of the apparatus.
Fig. 2 is a plan view.
Fig. 3 is a side view.
Figs. 4 to 6 give details of construction.

The plate 1, in turned out position, rests on a support 2 rigidly locked with a vertical shaft 3 rotating into a sleeve 4 fixed at 5 on the frame of the apparatus.

The shaft 3 is operated by a toothed wheel 6 which meshes with another toothed wheel 7, the gearings permit that the wheel 6 execute two rotations while the wheel 7 executes only one rotation. The shaft 8 on the toothed wheel 7 is rotated by an electric motor 9 operating by a belt 10, an endless screw 11 which meshes a helical toothed wheel 12. On the shaft 8 are keyed the cams 13, 14 with cylindrical contour. The half contours 15, 16 of these cams are of revolution around the axle of shaft 8, while the complementary half-contours 17 and 18 are of the form represented on the Fig. 5. The effect of these contours is exposed thereafter.

The arrangement of the cams relatively one to the other is such that the half cylinders of revolution 15 and 16 are always situated on the opposite sides of a plane containing the axle of shaft 8. In the position shown on Figs. 1 and 2 this plane has four traces $X_1X_2$—$Y_1Y_2$.

Two plungers 19, 20 maintain the rollers 21, 22 against the cams 13 and 14 by means of coil springs 23, 24. These plungers are provided, on a portion of their length, with a toothed face 25, 26. The plungers slide in the supports 27, 28, 29, 30 fixed to the frame of the apparatus.

The rectilinear gearing 25 meshes with a toothed wheel 31 placed in a horizontal plane, coaxial to a vertical column 32 rotated by the toothed wheel. The column rotates by means of bearings and abutments in a housing 33. On the column is tightened a sleeve 34 on which is bolted a corner 35 supporting an electric motor 36 with a vertical or approximately vertical shaft, which operates the brush 37.

Similarly, the rectilinear gearing 26 meshes with a toothed wheel 388 forming a part of an assembly constituted by two toothed wheels 38, 39, schematically represented on Fig. 1 by circumferences in dotted lines and represented in details on Fig. 4. These wheels are keyed on a shaft 40 rotating in a support 41 fixed to the frame of the apparatus. When the wheel 38 meshes with the rectilinear gearing 26 of the plunger 20, the toothed wheel 39 meshes with the rectilinear gearing 42 of a vertical rod 43 sliding in supports 44. Such supports are constituted by collars tightened on a fixed column 45 resting in 46 on the frame of the apparatus. On such column is tightened, at a desired height, a sleeve 47 similar to the sleeve 34 of the column 32, comprising a rotating shaft 48 (Fig. 6) around which can swing a lever; the arm 49 of the lever constitutes the support of a motor 50 operating a brush 51 and the arm 52 operates by rods 53, 54, 55 the up and down motions of a cap 56 cooperating with the support 2 to assure a good position of the plate 1 during the operation.

The oscillating movement of the lever is controlled by a rectilinear gearing 59 of the rod 43 meshing with a toothed wheel 60, fixed to said lever.

The cap 56 is pressed on the plate 1 by a helical spring 62 exercising a downwards thrust on an element 63 rotating into the sleeve 64, enabling the cap 56 to follow the plate in rotation.

The working of the apparatus is as follows:
According to the disposition of the elements described, when the rollers 21, 22 are simultaneously geared by the cylindrical contours of revolution 15, 16 of the cams 13, 14, the plate 1, resting on the support 2, undergoes the pressure of cap 56 and, on the other hand, the brushes 37 and 51 are in touch with the portion of plate to brush. After a half-turn of the cams the plate has accomplished a whole rotation and the brushing work is achieved. During the second half turn of the cams, the plungers 19 and 20 acted upon by the non-revolution contours 17 and 18 of said cams produce respectively a rotation of a given angle of the column 34 so that the brush 37 is separated from the plate, and an oscillating movement of the lever 49, 52 so that the brush 51 is separated from the plate and the cap 56 is lifted up. During this half turn the plate 1 is removed and replaced by a new plate and the process start again as described.

What I claim is:

1. An apparatus for the decoration of articles such as glass plates having one surface covered with a decorative coating, which comprises a driven first shaft, means to drive the first shaft, a supporting means for the article mounted transversely thereto on one end of the first shaft, a support disposed close to the first shaft, a motor mounted on the support, said motor having a driven, second, shaft a buffing tool on the second shaft, said tool being adapted to remove the decorative coating from given zones of the article, and means driven in synchronism with the first shaft to move the motor and buffing tool to present the latter to the article in one portion of the cycle of the apparatus and to remove it from the article in another portion of the cycle of the apparatus.

2. An apparatus as claimed in claim 1, wherein the support is a vertical column disposed parallel to the first shaft, wherein the supporting means for the article is mounted transversely thereto on top of the first shaft, the motor shaft is disposed vertically, and the motor and the buffing tool mounted thereon are mounted for movement generally horizontally toward and away from the article.

3. An apparatus as claimed in claim 2, wherein the motor is fast to the column, is mounted eccentrically thereon, and the column is oscillatable about its axis to move the motor and the buffing tool mounted thereon toward and away from the article.

4. An apparatus as claimed in claim 1, wherein the support is a vertical column disposed parallel to the first shaft, wherein the supporting means for the article is mounted transversely thereto on top of the first shaft, the motor shaft is disposed horizontally, and the motor and the buffing tool mounted thereon are mounted for movement generally vertically toward and away from the article.

5. An apparatus as claimed in claim 4, wherein the motor is pivotally mounted on the column so as to swing in a vertical plane, whereby to raise and lower the buffing tool relative to the article.

6. An apparatus as claimed in claim 5, comprising a clamping means disposed above the first shaft and mounted for movement downwardly toward and upwardly away from the article to clamp it on the article supporting means and to release it, respectively, and means connecting the clamping means to the motor so that the clamping means and the motor are raised simultaneously and are lowered simultaneously.

7. An apparatus according to claim 1, comprising a cam shaft geared to the first shaft to rotate in synchronism therewith, at least one cam on the cam shaft, and a cam follower engaged with the cam and connected to the motor whereby to move the motor and the buffing tool toward and away from the article in timed relation with the rotation of the article.

8. An apparatus as claimed in claim 3, comprising a cam shaft geared to the first shaft to rotate in synchronism therewith, a cam on the cam shaft, a cam follower in the form of an elongated plunger engaged with the cam, the plunger having a rack gear disposed longitudinally thereof, and a pinion connected to the column coaxially thereof and meshing with said rack gear, whereby the column is oscillated as the cam shaft turns.

9. An apparatus as claimed in claim 4, comprising a cam shaft connected to the first shaft to rotate at synchronism therewith, a cam on the cam shaft, a cam follower engaging such cam, and linkage means connecting the cam follower to the motor, whereby to move the motor and the buffing tool mounted thereon generally vertically toward and away from the article as the article rotates.

10. An apparatus as claimed in claim 9, wherein the linkage means comprises a first rack gear on the cam follower, a first pinion engaged with the first rack gear, an elongated vertically disposed plunger extending along the column, a pivotal motor support on the column, the upper end of the plunger being eccentrically connected to the motor support, a second pinion connected to rotate with the first pinion, and a second rack gear on the lower end of the plunger meshing with said second pinion.

11. An apparatus as claimed in claim 10 wherein one plunger rod is provided to bring the rotating buffing tool to its working position and to actuate levers acting on an element adapted to clamp the article on its rotating support.

12. An apparatus according to claim 11 wherein the clamping element in the form of a cap is driven by the levers by means of an elastic member exercising a downwards thrust on the article.

13. An apparatus for the decoration of articles such as glass plates having one surface covered with an enamel coating, which comprises a driven first shaft, means to drive the first shaft, a supporting means for the article mounted transversely thereto on one end of the first shaft, a support disposed close to the first shaft, a motor mounted on the support, said motor having a driven second shaft, a buffing tool on the second shaft, said tool being adapted to remove the enamel coating before it is baked from given zones of the article, and means driven in synchronism with the first shaft to move the motor and buffing tool to present the latter to the article in one portion of the cycle of the apparatus and to remove it from the article in another portion of the cycle of the apparatus.

14. An apparatus according to claim 1, wherein the buffing tool is constituted by a rotating brush provided with threads radially fixed on the rotation axle.

15. An apparatus according to claim 1, wherein the buffing tool is constituted by a rotating disc of supple material in particular a felt disc.

16. An apparatus according to claim 1, wherein the tool rotates about its axle at a high speed of the order of 1200 rotations per minute and even greater.

17. An apparatus according to claim 1, wherein the active surface of the tool is cylindrical.

18. An apparatus according to claim 1, wherein the active surface of the tool is shaped according to the contour of the region of the article where the decorative coating is to be removed.

References Cited in the file of this patent

UNITED STATES PATENTS

| | | |
|---|---|---|
| 1,251,114 | Ryon | Dec. 25, 1917 |
| 1,373,836 | Ryon | Apr. 5, 1921 |
| 1,584,709 | Ansorge | May 18, 1926 |
| 1,915,717 | Carley | June 27, 1933 |
| 2,324,410 | Miller | July 13, 1943 |
| 2,503,418 | Scranton | Apr. 11, 1950 |
| 2,573,220 | Riedesel et al. | Oct. 30, 1951 |
| 2,820,231 | Way et al. | Jan. 21, 1958 |